(12) United States Patent
Shin et al.

(10) Patent No.: US 8,701,144 B2
(45) Date of Patent: *Apr. 15, 2014

(54) DIGITAL BROADCASTING SYSTEM AND METHOD OF PROCESSING DATA IN DIGITAL BROADCASTING SYSTEM

(75) Inventors: Changho Shin, Pyeongtaek-si (KR); Sangrea Woo, Goyang-si (KR); Jangsun Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 458 days.

This patent is subject to a terminal disclaimer.

(21) Appl. No.: 12/605,871

(22) Filed: Oct. 26, 2009

(65) Prior Publication Data

US 2011/0099598 A1    Apr. 28, 2011

(51) Int. Cl.
  *H04N 7/18* (2006.01)
(52) U.S. Cl.
  USPC .................. 725/78; 725/80; 725/81; 725/83; 725/85
(58) Field of Classification Search
  USPC .................................... 725/78, 80–81, 83, 85
  See application file for complete search history.

(56) References Cited

U.S. PATENT DOCUMENTS

| | | | | |
|---|---|---|---|---|
| 5,862,452 | A * | 1/1999 | Cudak et al. | 725/81 |
| 6,340,997 | B1 * | 1/2002 | Borseth | 348/731 |
| 7,486,648 | B1 * | 2/2009 | Baranowski | 370/338 |
| 7,903,591 | B2 * | 3/2011 | Wakamatsu | 370/282 |
| 7,933,386 | B2 * | 4/2011 | Bruggemeier et al. | 379/51 |
| 8,347,341 | B2 * | 1/2013 | Markley et al. | 725/82 |
| 2002/0133558 | A1 * | 9/2002 | Fenno et al. | 709/208 |
| 2003/0061604 | A1 | 3/2003 | Elcock et al. | |
| 2003/0174673 | A1 * | 9/2003 | Tomobe et al. | 370/329 |
| 2003/0217125 | A1 * | 11/2003 | Brancati et al. | 709/220 |
| 2003/0229900 | A1 * | 12/2003 | Reisman | 725/87 |
| 2004/0158864 | A1 * | 8/2004 | Kakemura | 725/80 |
| 2005/0160475 | A1 * | 7/2005 | Waight et al. | 725/151 |
| 2007/0067814 | A1 * | 3/2007 | Wu | 725/98 |
| 2008/0098450 | A1 | 4/2008 | Wu et al. | |
| 2008/0282299 | A1 * | 11/2008 | Koat et al. | 725/93 |
| 2010/0023993 | A1 * | 1/2010 | Bugenhagen | 725/133 |
| 2010/0057226 | A1 * | 3/2010 | Lejeune | 700/90 |

FOREIGN PATENT DOCUMENTS

| | | |
|---|---|---|
| JP | 2009-055517 | 3/2009 |
| KR | 10-2003-0002973 | 1/2003 |
| KR | 10-2006-0004680 | 1/2006 |
| KR | 10-2007-0028163 | 3/2007 |
| WO | WO 2008/142456 A1 | 11/2008 |

* cited by examiner

*Primary Examiner* — Brian Pendleton
*Assistant Examiner* — Jonathan V Lewis
(74) *Attorney, Agent, or Firm* — McKenna Long & Aldridge LLP

(57) ABSTRACT

A digital broadcasting system and a method for processing data in the same are disclosed. A method for controlling a digital television (DTV) located in one independent space among a plurality of independent spaces physically separated from one another is disclosed. The method includes receiving a broadcast signal from a management server, processing the received broadcast signal using a hospitality middleware platform embedded in the DTV, and outputting audio/video (A/V) data on the basis of the processed broadcast signal. The hospitality middleware platform may include a switching layer for switching a first layer for processing a broadcast signal based on a broadcast standard of a first region and a second layer for processing a broadcast signal based on a broadcast standard of a second region, a flexible Digital Rights Management (DRM) layer capable of being voluntarily modified, and a downloadable engine layer capable of voluntarily programming an interactive service application.

8 Claims, 15 Drawing Sheets

(a)  (b)

DIGITAL BROADCASTING SYSTEM AND METHOD OF PROCESSING DATA IN DIGITAL BROADCASTING SYSTEM

BACKGROUND OF THE INVENTION

1. Field of the Invention

The present invention relates to a technology for controlling a Radio Frequency (RF) head end system and a plurality of TV sets in a limited space such as a hotel or hospital, and more particularly to a method for transmitting a signal to a TV set of a specific room from among a plurality of TV sets installed in respective rooms of a hotel or hospital using a multiple access point control system defined in the following description.

2. Discussion of the Related Art

Generally, a broadcast receiver receives a data stream including a broadcast signal, extracts a video and audio data stream corresponding to a user desired channel using service information contained in the received data stream, and outputs the extracted video and audio data stream to a display device.

However, according to the related art, detailed protocols or methods for more effectively transmitting and processing data to each room of a limited space such as a hotel or hospital are not defined yet.

SUMMARY OF THE INVENTION

An object of the present invention is to provide a solution for incorporating a Set Top Box (STB) based on a hardware structure provided from each System Integration (SI) company into a middleware platform.

Another object of the present invention is to provide a technology for replacing the hardware-based STB with the aforementioned middleware platform such that it can greatly reduce costs and an amount of human resources needed for management.

To achieve these objects and other advantages and in accordance with the purpose of the invention, as embodied and broadly described herein, a method is provided for controlling a digital television (DTV) located in one independent space among a plurality of independent spaces physically separated from one another, the method including receiving a broadcast signal from a management server, processing the received broadcast signal using a hospitality middleware platform embedded in the DTV, and outputting audio/video (A/V) data on the basis of the processed broadcast signal. The hospitality middleware platform may include a switching layer for switching a first layer for processing a broadcast signal based on a broadcast standard of a first region and a second layer for processing a broadcast signal based on a broadcast standard of a second region, a flexible Digital Rights Management (DRM) layer capable of being voluntarily modified, and a downloadable engine layer capable of voluntarily programming an interactive service application.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
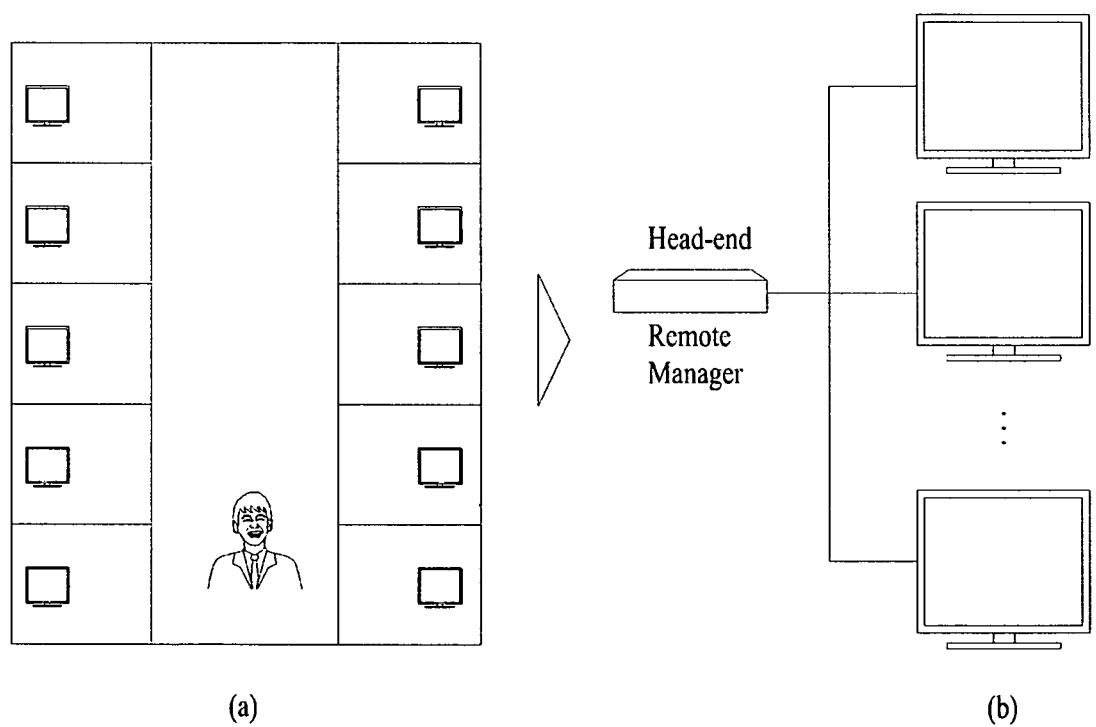
FIG. 1 is a diagram illustrating a multiple access point control system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

In accordance with the following embodiments of the present invention, a system for controlling a multiple access point using a multiple access point control system is proposed. For example, the access point may be a part for providing information to each limited physical space, communicating with devices contained in the physical space, and controlling the devices. By means of the multiple access point control system, a specific access point may provide information to a user located in a corresponding physical space. In addition, the devices located in the physical space may communicate with a server located outside of the physical space through the access point.

In addition, the term 'physical space' is separated from a communication space, such as a cell, defined in a wireless field. The cell acting as the communication space is in the range that is affected by radio waves from a specific base station, such that a user equipment (UE) can communicate with a corresponding base station in the above-mentioned range. However, the access point may be a part for controlling and managing a specific physical space or local area (e.g., each room of a hotel or hospital). Although the devices contained in the physical space can communicate with an access point of another physical space, the devices communicate with the access point of the corresponding physical space, and as such a detailed example thereof will hereinafter be described.

The multiple access point control system may transfer the same information to a corresponding physical space through a multiple access point, or may transfer different information to individual physical spaces. The multiple access point control system may control the access point at a remote site such that information suitable for a user of a physical space including the access point can be independently provided. In accordance with one embodiment of the present invention, the server of the multiple access point control system includes a user interface capable of allowing a person who controls the server to easily control the multiple access point.

The access point may be arranged at a specific position of each physical space. In order to easily provide information to the user, the access point may be configured in the form of a card, such that it can be inserted into a television or a set-top box. In accordance with one embodiment of the present invention, the card-type access point designed to be inserted into a television or set-top box may also be abbreviated to an AP. In the case where the AP card is inserted into the television, the user can recognize information to be transmitted through the AP card by viewing the television.

Such a system may be located at a variety of places, for example, a hotel, a hospital, a school, a prison, etc. For convenience of description and better understanding of the present invention, it is assumed that the above-mentioned system is located at a hotel such that the multiple access point and a control system thereof are operated in the hotel. However, the scope and spirit of the present invention are not limited thereto, and the present invention is also applicable to other examples.

In the case of the hotel, a user lodges in the hotel, such that the user can view content such as broadcast content through a TV. If content provided to a user of a room through the TV is pay-per-view content, an accounting system connected to the TV can charge a usage fee to user-viewed content. However, a driving circuit associated with the accounting system is installed in each TV. If there is a need to upgrade a corresponding system, a hotel administrator who uses the related art must upgrade TV systems installed in all rooms, resulting in greater inconvenience of use.

In addition, since administrating all rooms is manually carried out by the hotel administrator, a large hotel having many rooms consumes an unnecessarily long period of time and great cost to manage such rooms.

With the increasing number of guests or lodgers who use wireless communication, there are many cases wherein a wireless communication network is installed in each floor of a hotel. However, there is a difficulty in providing enough bandwidth for all guests of respective floors to easily use the wireless communication network, such that it causes greater inconvenience to a guest or administrator of a hotel.

In the case of an old hotel, a hotel history may be considered to be a brand value of the hotel. In order to provide each room of the hotel with a control system, a communication system, and another system that allows individual services to be executed in all rooms, a large amount of costs are consumed. If the hotel architecture is changed to another to install the above-mentioned systems, the hotel prestige or value may be greatly deteriorated.

Therefore, according to the following embodiments of the present invention; if individual services are provided to users of rooms serving as different physical spaces, and an access point capable of entirely managing the rooms is installed in each room, the following embodiments can solve the above-mentioned problems by controlling only the access point of each room without great modification of a conventional hotel design. A multiple access point control system according to one embodiment of the present invention will hereinafter be described with reference to the annexed drawings.

FIG. 1 is a diagram illustrating a multiple access point control system according to one embodiment of the present invention. FIG. 1(a) shows a conventional hotel management system. FIG. 1(b) shows a multiple access point control system according to one embodiment of the present invention.

In accordance with the related art shown in FIG. 1(a), if a hotel administrator desires to upgrade a system applied to a TV of each room, the hotel administrator has to manually upgrade TVs of all rooms of the hotel. In other words, as shown in FIG. 1(a) illustrating the related art, if a device in any one room is wrongly operated or an empty room is brightly lit, the hotel administrator should directly visit each room so as to correct the incorrect operation of the device or switch off the light of the empty room.

The above-mentioned inconvenience will hereinafter be described in detail from the economic point of view.

Provided that a cost required for upgrading a TV driving circuit of each room once is denoted by 'a', the number of rooms is denoted by 'b', the number of software upgrade times every year is denoted by 'c', and a lifetime of a TV is denoted by 'd', a total cost 'a×b×c×d' is continuously consumed to maintain such a system.

FIG. 1(b) shows an exemplary case in which a multiple access point control system controls an access point of each room according to one embodiment of the present invention. It is assumed that the access point is configured in the form of a card such that the card-type access point is inserted into a TV. The hotel administrator controls an access point card of each room using a headend (server) connected to a TV of each room. The access point card can provide an individual service to a user of each room through a TV under the remote control of a headend. In addition, the access point card may communicate with a device of each room, or may control a variety of devices installed in each room.

Most hotels include an installation for a Video On Demand (VOD) accounting service for a TV. If an access point card is installed in the TV, each hotel can provide many more services to the user through the access point card. Therefore, a multiple access point control system can be easily installed in the hotel having many physical spaces, and can also be easily managed and maintained by the hotel administrator.

A variety of services can be provided to a user through the TV having the access point card. Exemplary services are as follows. If the user enters the room, a hotel logo is displayed on the TV, and a message including respective user names can be displayed on the TV.

In addition, the hotel notification or the hotel advertisement, etc. can be displayed on the TV, and travel or transportation information can be provided to the user. In addition, user desired information of respective rooms can be separately provided to individual rooms, and a detailed description thereof will hereinafter be described in detail.

Figure 2:
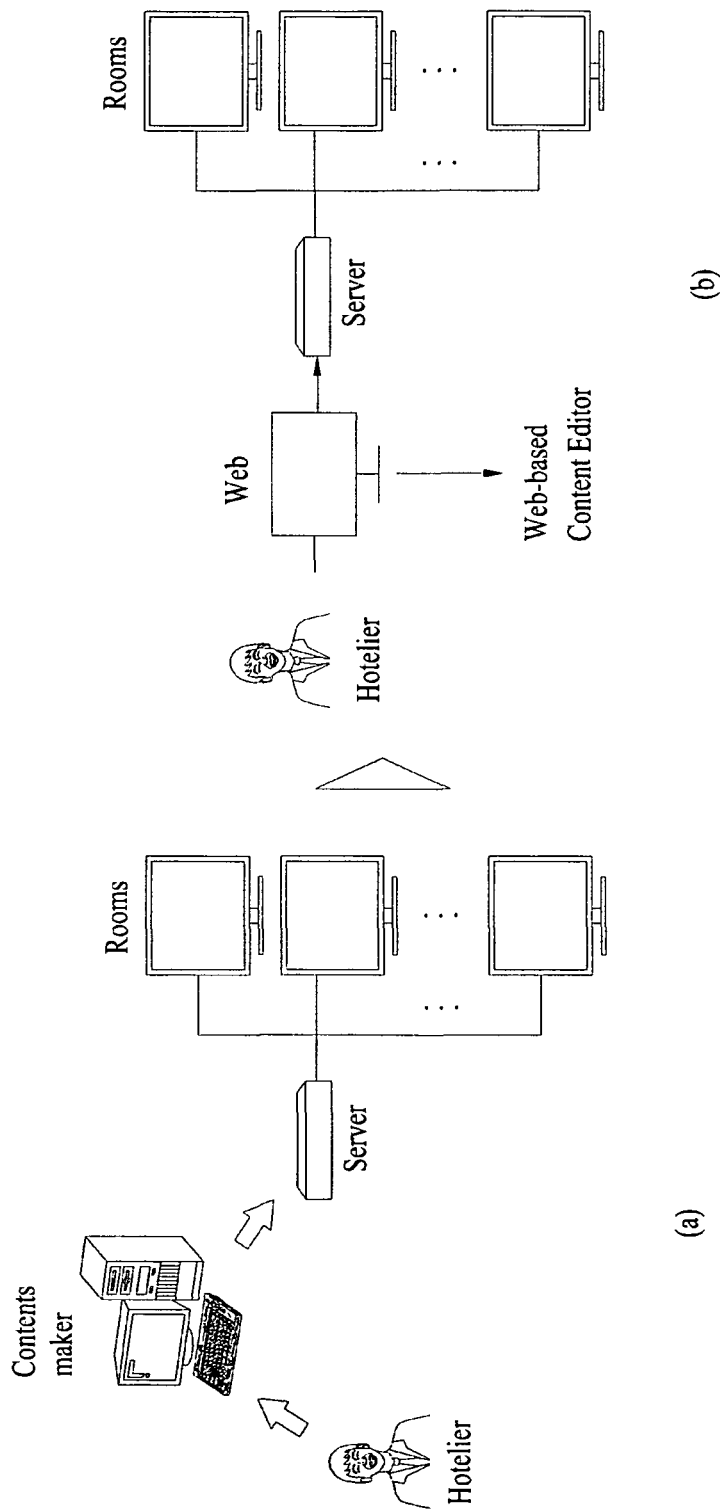
FIG. 2 is a diagram illustrating a multiple access point control system according to another embodiment of the present invention.

FIG. 2 is a diagram illustrating a multiple access point control system according to another embodiment of the present invention. FIG. 2(a) shows a system for allowing a hotel to charge an additional fee through a TV according to the related art. FIG. 2(b) is a diagram illustrating a multiple access point control system according to another embodiment of the present invention.

Referring to FIG. 2(a), the hotel administrator asks an external content provider or a system administrator either to manage a server for controlling TVs of respective rooms or to provide content. Accordingly, according to the related art, the content provider or the system administrator controls and manages not only content, that must be provided to the user through the TV, but also an accounting system for the content, and therefore, the TV of each room can provide a pay-per-view service to the user of each room.

According to the related art, if the hotel administrator changes a pay-per-view service to another service, the hotel administrator cannot directly control a detailed description required for the changed service. In the case of changing the system operation, the hotel administrator has difficulty in changing such a system operation under the condition that the hotel administrator sends the external content provider no request. In other words, it is next to impossible for the hotel administrator to change or manipulate services provided to each room independently from the system administrator.

Referring to FIG. 2(b), the server of the multiple access point system according to another embodiment of the present invention can allow the hotel administrator to directly provide content to a user of each room, and can also allow the hotel administrator to provide different information to the user. For example, the server for use in the multiple access point control system may have a Web-based editor. The user interface of the multiple access point control system can allow the hotel administrator to conveniently manage respective rooms, such that the hotel administrator can conveniently provide requirements of each room and an individual service that must be provided to each room.

The hotel administrator can edit services provided to each room using the user interface and the Web-based editor, such that individual or common services can be provided to respective rooms. If the hotel administrator edits the Web-based editor, the server of the multiple access point system can easily transmit an additional message to a user of a specific room, or can transmit specific content to the user. A detailed description thereof will hereinafter be described in detail.

Figure 3:
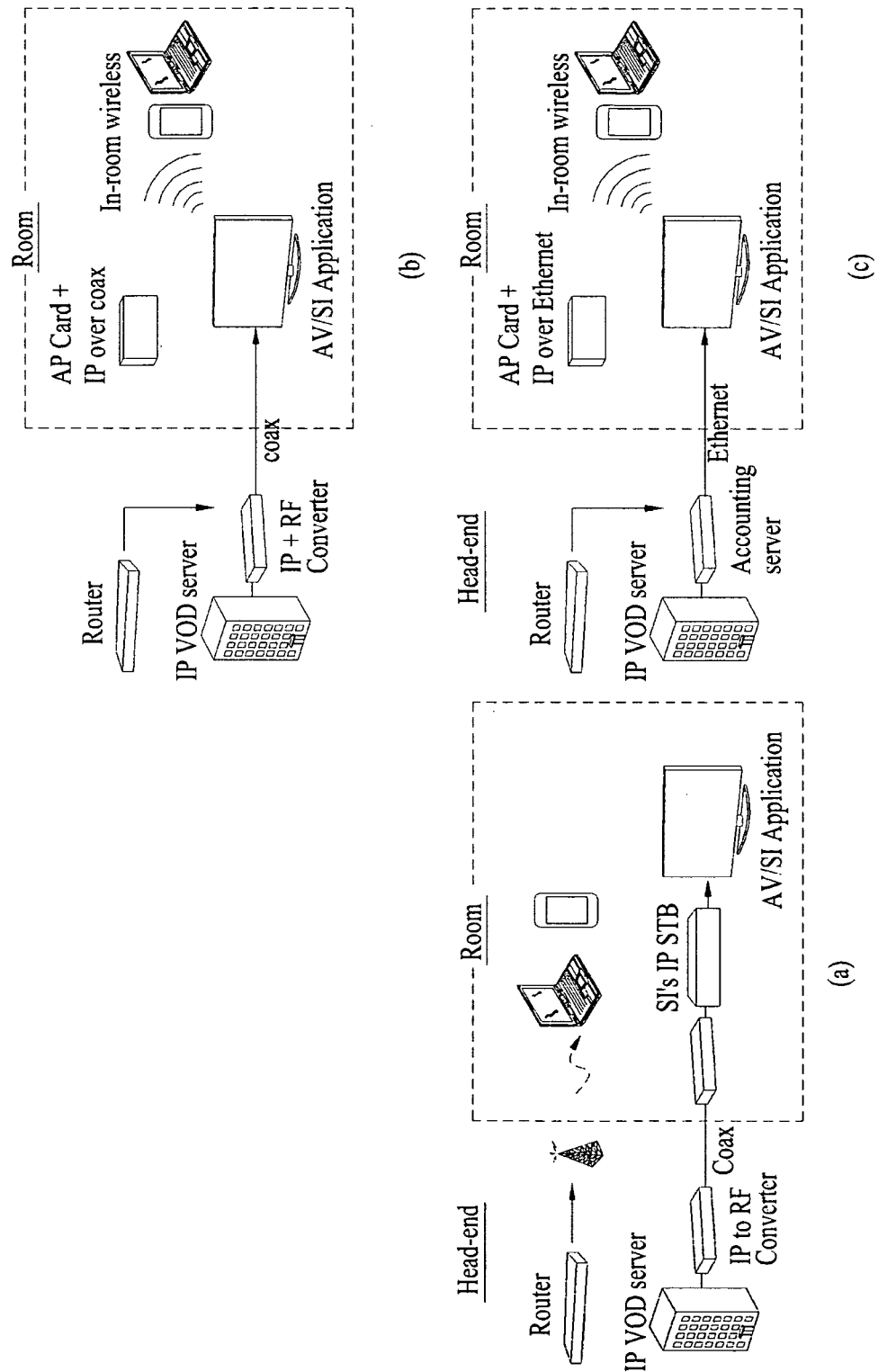
FIG. 3 is a diagram illustrating a multiple access point control system according to a yet another embodiment of the present invention.

FIG. 3 is a diagram illustrating a multiple access point control system according to yet another embodiment of the present invention. FIG. 3(a) illustrates a system capable of being applied to each room according to the related art. FIGS. 3(b) and 3(c) illustrate a multiple access point control system according to yet another embodiment of the present invention.

In the case of most hotels, a cable network is installed in each room as shown in FIG. 3(a). The cable network is connected to a set-top box of each room, or provides a VOD service to each room through a VOD server of the hotel.

For example, if the VOD server transmits an IP packet having video content, the IP-to-RF converter converts the IP packet into an RF signal, and transmits the RF signal to the cable network.

In addition, the set-top box or TV of each room receives the RF signal from the VOD server, and displays video content.

Referring to FIG. 3(a), if the user of each room desires to use the Internet or a wireless phone using a notebook computer based on wireless communication, it is necessary for each room to include a router connected to the Ethernet network or a wireless communication relay module. However, presently, most hotels include only a cable network and do not include a local area network (LAN) or a wireless communication network, such that high costs are needed to additionally install communication lines.

Recently, some hotels have installed one or two wireless communication relay models in each floor so as to provide a wireless communication service. However, the user of each room may not often acquire a service of a desired bandwidth. As a result, high costs are needed to install an additional wireless communication relay module in all rooms.

FIGS. 3(b) and 3(c) illustrate a service capable of being provided through a multiple access point control system according to yet another embodiment of the present invention. A cable network or an Ethernet network is installed in each room of the hotel, and the access point card is installed in a TV of each room. The server of the multiple access point control system is connected to the IP-to-RF converter and the router.

However, the embodiment of the present invention may be applied to one case in which the hotel environment includes the Coax network and another case in which the hotel environment includes the Ethernet network. If the hotel environment includes the Ethernet network, the hotel server additionally includes the accounting server to charge a usage fee on the VOD viewed, by a user who lodges in the hotel.

In addition, from the viewpoint of a protocol layer, if the hotel environment includes the Coax network, Digital Storage Media Command and Control (DSM-CC) is converted into data based on an IP packet, and the IP-packet data is transferred using a cable modem protocol. On the other hand, if the hotel environment includes the Ethernet network, the DSM-CC is transferred as the IP packet.

In the meantime, the access point card may serve as a wireless communication module that transmits radio waves to a notebook computer or wireless phone of a user of each room. The notebook computer or wireless phone used by the user may communicate with an external server through the AP card, the cable network or the router.

The server of the multiple access point control system may provide video content or the like to the user of each room or provide a variety of services suitable for the user to the user of each room.

If the AP card is inserted into the television, the AP card may include middleware to drive a variety of applications provided to the user. In addition, the AP can support the multi-protocol interface, such that it may be used as an access point of the AP wireless communication or may control devices of respective rooms.

The IP-to-RF converter transmits the IP packet over a cable network, and the AP card includes the RF-to-IP converter such that it can provide an Internet-based communication service and a multimedia broadcast service to the user. The AP card includes general-purpose middleware standardized for the application provided to the user. Therefore, the service provided by the hotel administrator can be displayed on the TV regardless of TV functions. The AP card, that enables respective hotels to use different content protection functions so as to charge a usage fee for content, includes an operating system that enables various content protection modules to be implemented with software. Therefore, although respective hotels use different content protection functions, content can be transferred to the user through the same AP card, and a detailed description thereof will hereinafter be described in detail.

In the case of a hotel, a user may request a call service for a specific time from the hotel administrator. In the case of using the multiple access point control system, a reserved message may be transferred to the user through the television.

The AP card may communicate with other devices of each room, and drive the application supported by the multiple protocol interface, such that the user of the room may also control devices of the room through the TV.

The television including the AP card may provide a user interface for enabling the user to control devices of the room. For example, the television including the AP card may display various devices capable of being controlled in each room. The television may display a corresponding room and the positions of devices installed in the corresponding room.

For example, if the AP card communicates with the curtain control device, the user can freely open or close a curtain through the user interface displayed on the TV.

In addition, when adjusting an air-conditioner or a hygrometer, the user does not directly adjust a corresponding device, and can remotely operate the user interface displayed on the TV including the AP card.

Figure 4:
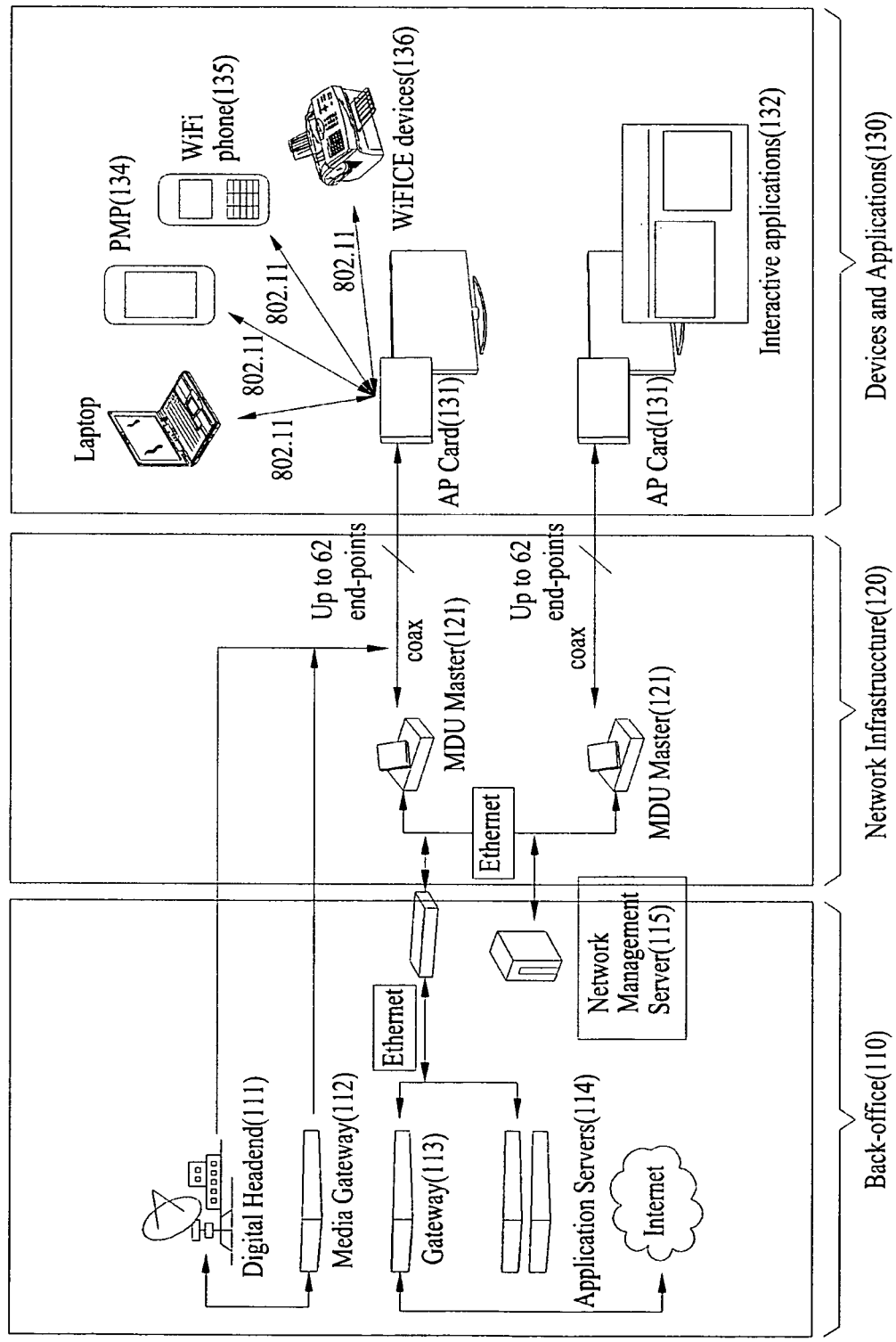
FIG. 4 is a diagram illustrating an access point and a multiple access point control system according to one embodiment of the present invention.

FIG. 4 is a diagram illustrating an access point and a multiple access point control system according to one embodiment of the present invention.

Referring to FIG. 4, the entire system according to one embodiment of the present invention includes a back-office 110, a network infrastructure 120, devices and applications 130, etc. The network management server 115 shown in FIG. 4 carries out functions of the multiple access point control system, and the AP card 131 carries out functions of the multiple access point.

For example, the back-office 110 includes a digital head-end 111, a media gateway 112, a gateway 113, application servers 114, a network management server 115, etc. The back-office 110 may be used to transmit broadcast data and IP data. For example, the back-office 110 may be a broadcast station or the like.

The network infrastructure 120 may include, for example, a Master Data Unit (MDU), etc. For example, the devices and applications 130 includes an Access Point (AP) card 131, interactive applications (for example, DTV) 132, a laptop 133, a Portable Multimedia Player (PMP) 134, a WiFi phone 135, WiFi CE devices 136, etc.

Specifically, the network management server 115 may be managed by the hotel or the service provider. The network management server 115 controls the MDU 121, such that it provides various data to the AP card 131 mounted to the DTV 132 of each room of the hotel.

The AP card 131 may transmit and receive data that is associated with VoIP, VOD, 2-way communication, personal area network, etc., and may process such data.

As shown in FIG. 4, the DTV 132 including the AP card 131 may share such data with peripheral devices (e.g., 133, 134, 135, 136, etc. of FIG. 4) of the DTV.

In addition, although it is assumed that the MDU 121 is connected to the AP card through a coaxial cable as shown in FIG. 4, the scope and spirit of the present invention are not limited thereto, and the embodiment of the present invention may also include another case wherein the network management server 115 is connected to the AP card 131 over the Ethernet.

Figure 5:
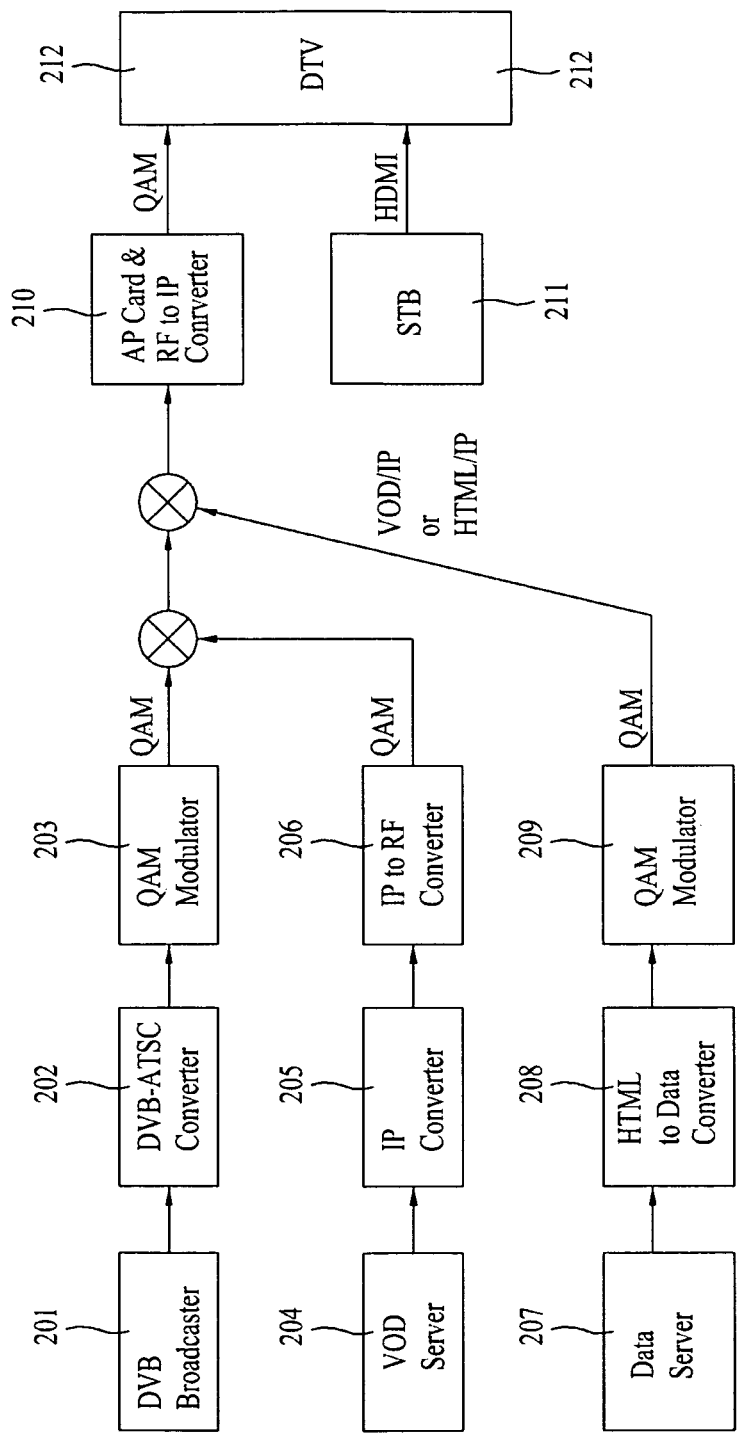
FIG. 5 is a diagram illustrating an access point and a multiple access point control system according to another embodiment of the present invention.

FIG. 5 is a diagram illustrating an access point and a multiple access point control system according to another embodiment of the present invention. FIG. 5 is a detailed block diagram of the entire system, differently from FIG. 4.

Referring to FIG. 5, the Digital Video Broadcasting (DVB) broadcaster 201 transmits a DVB signal, the DVB to ATSC Converter 202 converts the DVB signal into an ATSC signal, and the QAM modulator 203 modulates the converted ATSC signal into a QAM signal.

The VOD server 204 transmits a VOD signal, the IP converter 205 converts the VOD signal into the IP signal, and the IP to RF converter 206 converts the IP signal into the RF signal.

The Data Server 207 transmits an HTML signal, the HTML to Data converter 208 converts the HTML signal into data, and the QAM modulator 209 modulates the converted data into a QAM signal.

An AP CARD & RF to IP converter 210 receives the QAM signals from the QAM modulators 203 and 209 and the IP to RF converter 206.

The AP CARD & RF to IP converter 210 may directly transmit the QAM signal to the DTV 212. If necessary, the AP CARD & RF to IP converter 210 may convert the QAM signal into the IP signal, and transmit the IP signal to the set-top box (STB) 211.

In addition, the DTV 212 may process the QAM signal received from the AP CARD & RF to IP converter 210, and the processed signal may be displayed according to various display schemes, for example, LCD, PDP, ELD, VFD, etc.

The STB 211 may be connected to the DTV through a cable, for example, an HDMI, DVI, or D-sub cable.

The STB 211 may be connected to the DTV 212 over a wireless network, such as Zigbee, Bluetooth, or Wlan, etc.

Meanwhile, the DVB broadcaster 201, the VOD server 204, and the Data Server 207 may be managed by a broadcast station, a Content Provider (CP), a Service Provider (SP), etc. For example, the DVB to ATSC Converter 202, the IP Converter 205, the HTML to Data Converter 208, the QAM Modulator 203, the IP to RF Converter 206, and the QAM Modulator 209 may be managed by a hotel, a hospital, etc. For example, the AP card & RF to IP Converter 210, the STB 211, or the DTV 212 may represent a digital broadcast receiver.

Therefore, in the case of using the system shown in FIG. 5, a hotel not providing Internet services can easily provide Internet services (e.g., Internet services received from the VOD server or the Data Server) to guests of each room of the hotel.

Figure 6:
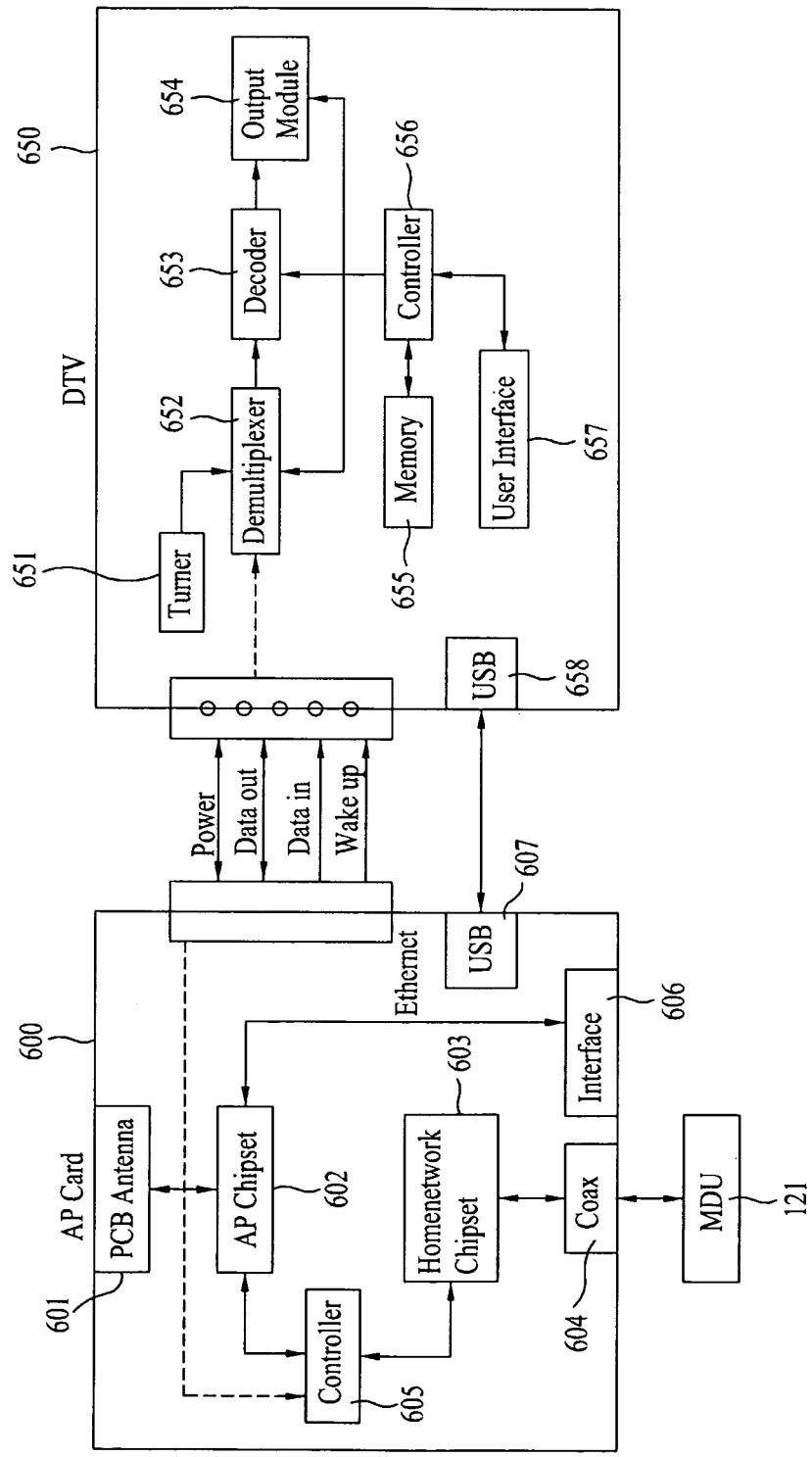
FIG. 6 is a block diagram illustrating an AP card and a DTV according to one embodiment of the present invention.

FIG. 6 is a block diagram illustrating an AP card and a DTV according to one embodiment of the present invention. FIG. 6 illustrates an exemplary case in which there is no DTV Ethernet in each room of the hotel. For example, the AP card shown in FIG. 6 may serve as the above-mentioned multiple access point.

Referring to FIG. 6, the AP card 600 includes a variety of modules, for example, a PCB antenna 601, an AP chipset 602, a homenetwork chipset 603, a Coax module 604, an interface 606, a controller 605, a USB 607, etc. As shown in FIG. 6, the DTV 650 includes a variety of modules, for example, a controller 656, a tuner 651, a demultiplexer 652, a decoder 653, an output module 654, a memory 655, a user interface 657, a USB 658, etc. However, for better understanding of the present invention, the MDU 121 shown in FIG. 6 may also correspond to the MDU shown in FIG. 4 as necessary.

The AP card 600 may be connected to the MDU 121 through the coax line. The controller 605 may copy packets between the AP chipset 602 and the homenetwork chipset 603. Further, the controller 605 controls the AP chipset 602 and the homenetwork chipset 603. For example, the homenetwork chipset 603 may be a Multimedia over Coax Alliance (MoCA) chipset or a Home Phoneline Networking Alliance (HPNA) chipset, etc.

The AP chipset 602 may control communication with a plurality of devices contained in each room including the DTV 650. In more detail, the AP chipset 602 may provide a wireless Internet service such as WiFi to the devices.

The homenetwork chipset 603 may convert the RF signal into IP data through a cable network (coax) 604. If it is necessary to transmit the IP data to a wireless communication device of each room, the homenetwork chipset 603 may transmit the IP data to the AP chipset 602. The homenetwork chipset 603 may convert the IP data received from the AP chipset 602 into an RF signal, and transmit the RF signal to the coax module 604. The PCB antenna 601 may be a module that enables several devices of each room including the DTV 650 to wirelessly communicate with the AP chipset 602.

In the meantime, the tuner 650 receives the RF broadcast signal. The USB 607 of the AP card 600 may transmit and receive data to and from the USB 658 of the DTV 650, for example, large amounts of data for firmware or data for setting a Service Set Identifier (SSID) may be communicated between the USB 607 and the other USB 658.

The AP card 600 transmits and receives a VoIP signal through, for example, the AP chipset 602, transmits a VOD signal to the DTV 650 through the USB 607, and provides information (e.g., GEM application data, etc.) associated with data broadcast content of the hotel through the USB 607. The controller 656 of the DTV 650 controls a tuner 651, a demultiplexer 652, a memory 655, a user interface 657, etc. The demultiplexer 652 may demultiplex a video signal, an audio signal, and data received from either the AP card 600 or the tuner 651.

The decoder 653 may decode the demultiplexed video and audios signals and the demultiplexed data. The output module 654 may output the decoded video and audio signals and the decoded data.

Further, the memory 655 may store some or all information received from the AP card 600. The user interface 657 may transmit a user-entry command signal to the controller 656.

Figure 7:
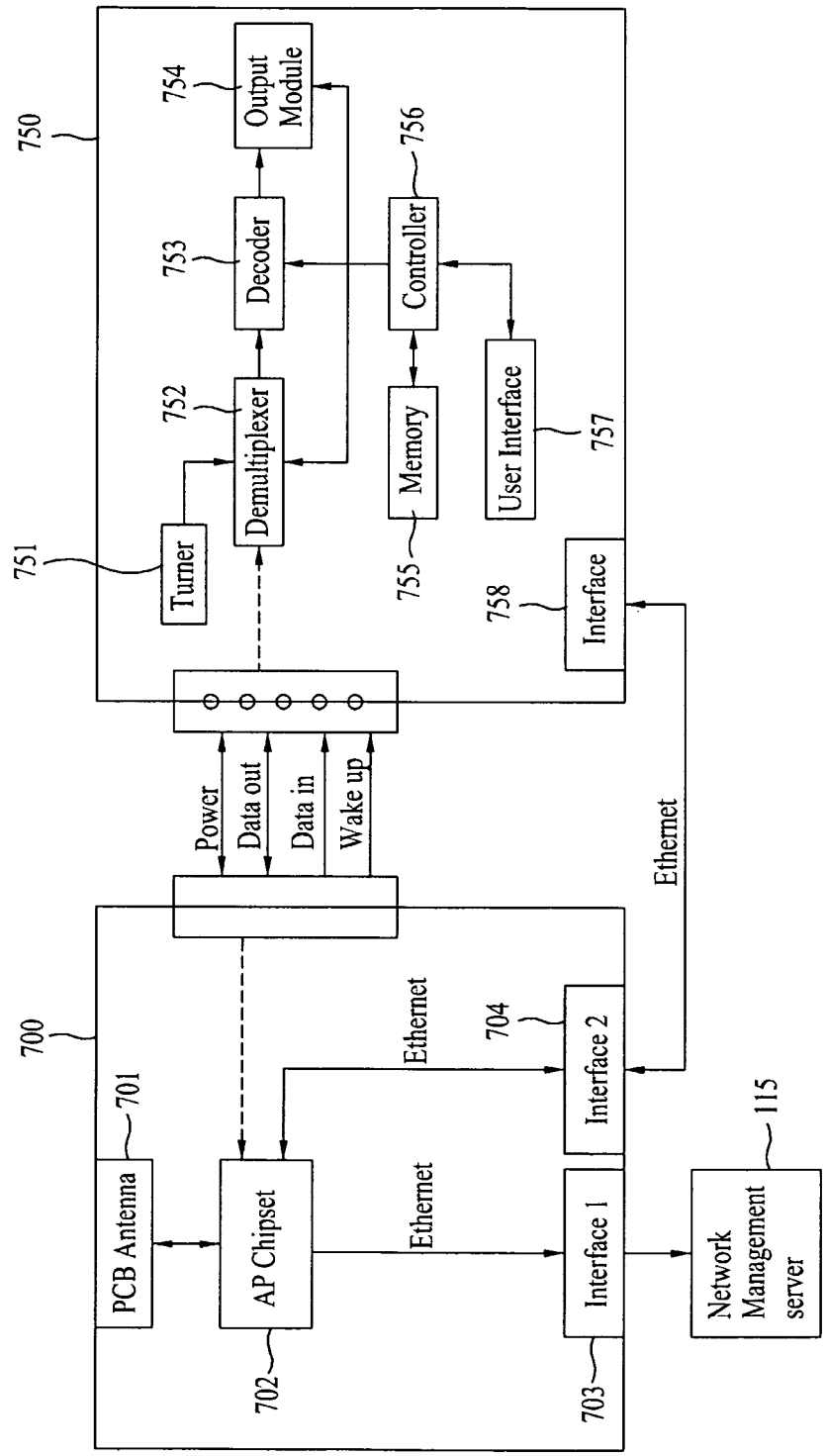
FIG. 7 is a block diagram illustrating an AP card and a DTV according to another embodiment of the present invention.

FIG. 7 is a block diagram illustrating an AP card and a DTV according to another embodiment of the present invention. FIG. 7 illustrates an exemplary case that the DTV contained in each room of the hotel includes the Ethernet connection. The main concept of FIG. 7 may also be understood by referring to FIG. 6 as necessary. For example, the AP card shown in FIG. 7 may serve as the access point.

Referring to FIG. 7, the AP card 700 includes a plurality of modules, for example, a PCB antenna 701, an AP chipset 702, a first interface (Interface 1) 703, a second interface (Interface 2) 704, etc. For example, the DTV 750 includes a plurality of modules, for example, a controller 756, a tuner 751, a demultiplexer 752, a decoder 753, an output module 754, a memory 755, a user interface 757, an interface 758, etc. However, for better understanding of the present invention, the network management server 115 shown in FIG. 7 may also correspond to the network management server shown in FIG. 4.

Differently from FIG. 6, the AP card 700 shown in FIG. 7 receives the Ethernet signal from the network management server 115, and the AP chipset 702 may communicate with several devices contained in each room having the DTV 750.

In more detail, the AP chipset 702 may provide an Internet service such as WiFi to several devices. The PCB antenna 701 may be a module that enables several devices of each room including the DTV 650 to wirelessly communicate with the AP chipset 602.

Further, the first interface (Interface 1) 703 is a module for transmitting and receiving an Ethernet signal to and from the network management server 115. The second interface (Interface 2) 704 is a module for transmitting and receiving an Ethernet signal to and from the interface 758 contained in the DTV 750.

In addition, the controller 756 of the DTV 750 controls a demultiplexer 752, a decoder 753, an output module 754, a memory 755, a user interface 757, etc. The demultiplexer 752 may demultiplex a video signal, an audio signal, and data received from the AP card 700.

The decoder 753 may decode the demultiplexed video and audios signals and the demultiplexed data. The output module 754 may output the decoded video and audio signals and the decoded data.

Further, the memory 755 may store some or all information received from the AP card 700. The user interface 757 may transmit a user-entry command signal to the controller 756.

Figure 8:
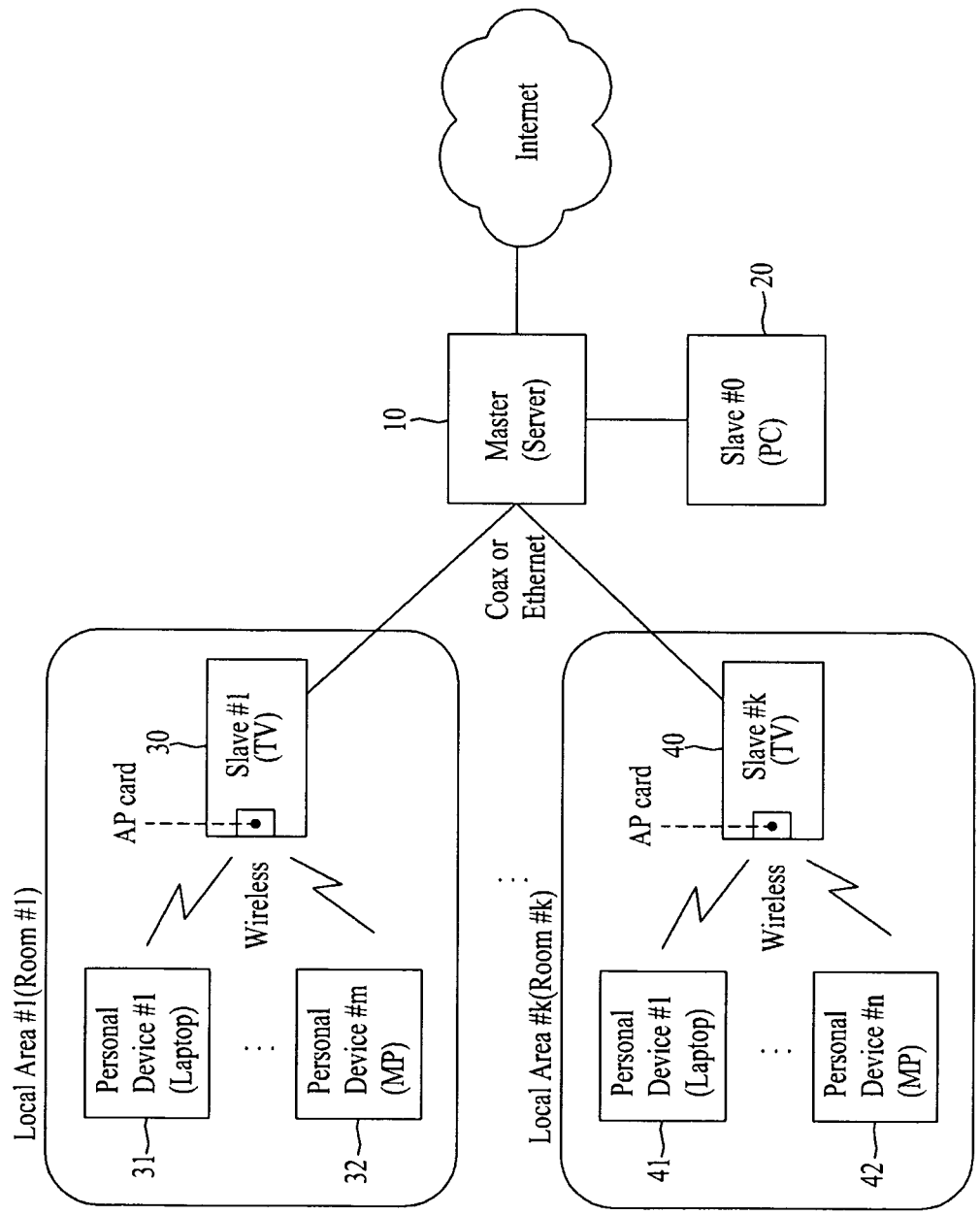
FIG. 8 is a block diagram illustrating a system for providing an Internet service to each room of a hotel according to one embodiment of the present invention.

FIG. 8 is a block diagram illustrating a system for providing an Internet service to each room of a hotel according to one embodiment of the present invention.

Referring to FIG. 8, the master 10 may perform a function of the above-mentioned multiple access point control system. The AP card may perform, for example, a function of the multiple access point.

First of all, the embodiment of the present invention discloses a system for providing an Internet service installed in a specific place such as a hotel having one or more rooms. Referring to FIG. 8, the above-mentioned system includes the master connected to the Internet, local slaves 30 and 40, and a management slave 20. The master 10 is connected to the Internet. The local slaves 30 and 40 are connected to the master 10 by wire, and are wirelessly connected to personal devices 31, 32, 41, and 42 of specific local areas #1 to #K. The management slave 20 may be connected to the local slaves 30 and 40 through the master 10.

In the meantime, the master 10 may be, for example, a hotel server or a headend. The management slave 20 is, for example, a personal computer (PC) installed in a hotel reception area or front desk. The local slave 30 or 40 may be, for example, a TV installed in each hotel room.

In addition, as can be seen from FIG. 8, the local slaves 30 and 40 may include a wired/wireless communication unit for communicating with the PCs 31, 32, 41, and 42 (e.g., a laptop computer and a mobile phone) used by the user who is located at a corresponding local area, and may further include another wired/wireless communication unit for communicating with the master 10.

For example, the wireless communication unit may be a WiFi PAN access point module. For example, the wired communication unit may be a MoCA/HPNA module. Meanwhile, the WiFi PAN access point module is manufactured in the form of a wireless communication chip that can perform wireless communication through the Personal Area Network (PAN) according to the WiFi technology for supporting various wireless network standards (e.g., 802.11, 802.11a, 802.11b, and 802.11g protocols).

In addition, the MoCA/HPNA module is manufactured in the form of a chip using a telephone line, a power line, or a coaxial cable (Coax). In this case, the Multimedia over Coax Alliance (MoCA) technology and the Home Phoneline Networking Alliance (HPNA) technology may be applied to the manufactured chip, such that the chip can communicate with the master 10 by wire.

Figure 9:
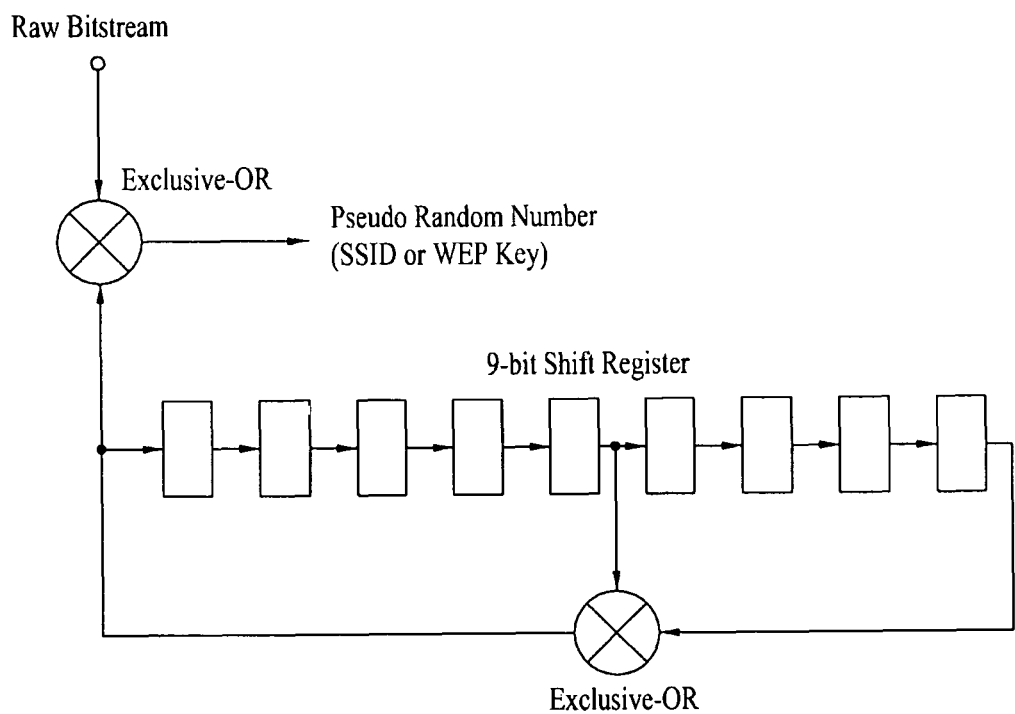
FIG. 9 is a diagram illustrating a procedure for generating a unique SSID and WEB key value according to one embodiment of the present invention.

FIG. 9 is a diagram illustrating a procedure for generating a unique SSID and WEB key value according to one embodiment of the present invention.

Referring to FIG. 9, the management slave 20 or the local slaves 30 and 40 shown in FIG. 8 generate Pseudo Random Numbers indicating a unique Service Set Identifier (SSID) and a Wired Equivalent Privacy (WEP) key using two Exclusive-OR gates and a 9-bit shift register.

For example, the SSID is a unique ID N bytes long (e.g., unique ID 32 bytes long) added to each header of packets transmitted over a wireless LAN, and is used like a code or password when connected to wireless terminals. The SSID may discriminate one wireless LAN from other wireless LANs. Therefore, according to one embodiment of the present invention, all access points or wireless terminals, that desire to access a specific wireless LAN, are designed to use the same unique SSID.

The WEP encrypts data, that is communicated between an adaptor and an access point connected to the wireless LAN, into 64 bits (40+24) or 128 bits (104+24), resulting in increased security. According to one embodiment of the present invention, the WEP key value is used as an encryption key value, and the same WEP key value is assigned to a plurality of communication terminals.

In the meantime, the SSID is configured in the form of a predetermined unique value that is a combination of a unique number (e.g., a hotel room number 501) assigned to a specific local area and a name (e.g., KIM) of a user who uses the specific local area. The WEP key is configured in the form of a predetermined unique value that is a combination of a name (e.g., KIM) of a user who uses the specific local area and a card number (e.g., 4518-XXXX-XXXX-XXXX).

The local slave 30 transmits the SSID to personal devices 31 and 32 contained in the corresponding local area (LOCAL AREA #1), and displays the WEP key value on the screen. The user may establish the SSID and the key value in each personal device. Therefore, the personal device in which the SSID and the WEP key value are established may receive Internet service through the local slave and the master, and a detailed description thereof will hereinafter be described with reference to FIGS. 10 to 12.

Figure 10:
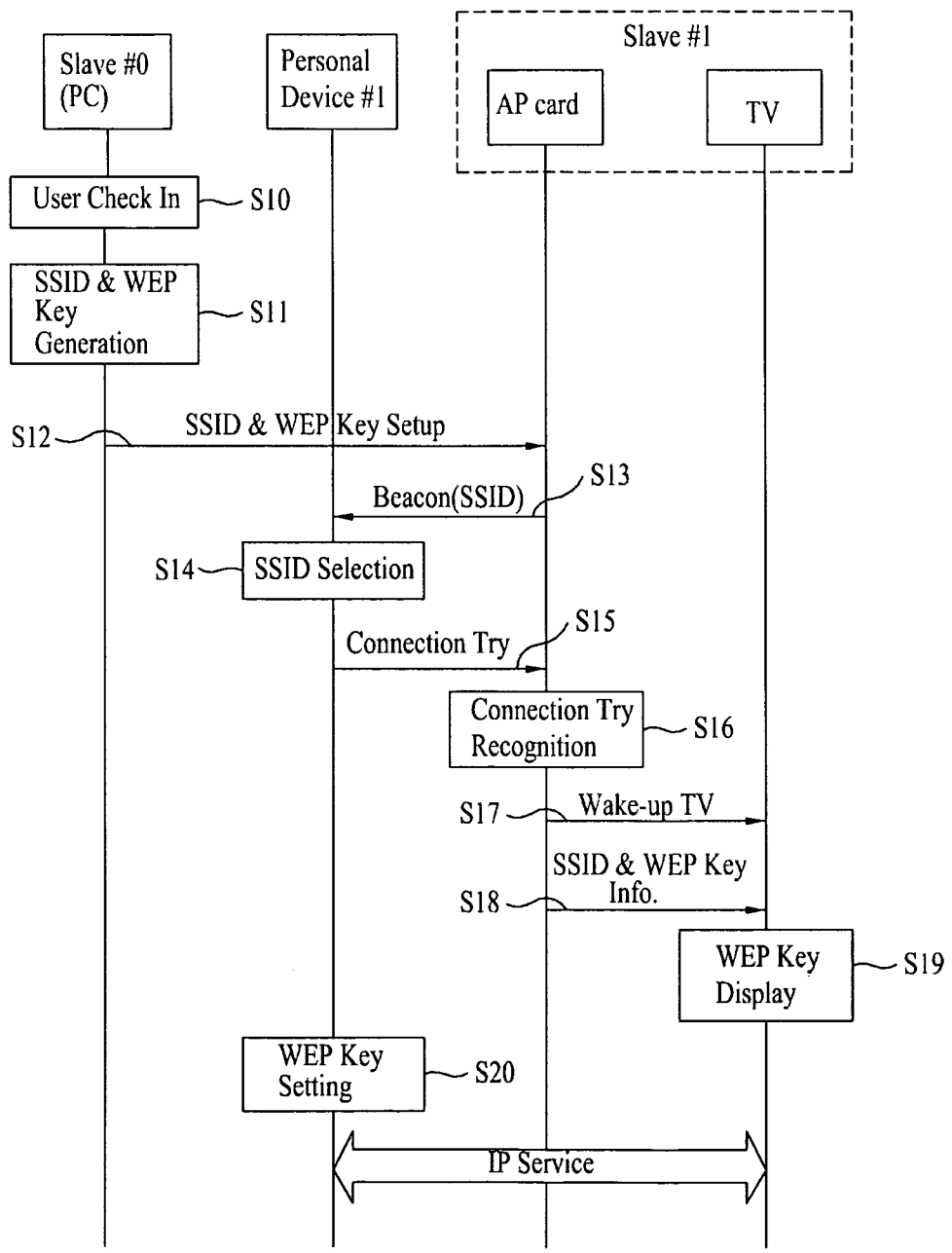
FIG. 10 is a flowchart illustrating a method for providing an Internet service according to a first embodiment of the present invention.

FIG. 10 is a flowchart illustrating a method for providing an Internet service according to a first embodiment of the present invention.

Referring to FIG. 10, if a user who desires to lodge in a hotel checks in to the hotel at step S10, a management slave (Slave #0) indicating a personal computer (PC) located at the front desk of the hotel combines a unique number of a hotel room in which the user will stay with name of the user, and generates a unique SSID and a WEP key value at step S11.

The Slave #0 establishes the SSID and the WEP key value in a local slave (Slave #1) connected to the Slave #0 through the master 10 at step S12. For example, the Slave #1 transmits the SSID to the Personal Device #1 using a beacon signal at step S13.

If the personal device #1 selects the SSID at step S14, the user may attempt to access the Internet service. In this case, the personal device #1 transmits a connection try command signal to the AP card at step S15. If the AP card recognizes an Internet service access attempt signal on the basis of the connection try command signal at step S16, the AP card wakes the DTV contained in the Slave #1 at step S17.

The AP card may transmit the SSID and the WEP key value to the DTV at step S18, and the DTV may display the WEP key value on the screen at step S19. The user enters the displayed WEP key value in the personal device #1 so as to perform a series of WEP key setup operations at step S20. Thereafter, the user requests the Internet service, such that the personal device #1 can receive the Internet service and the like through the local slave (Slave #1) and the master using the established Internet SSID and WEP key value.

Figure 11:
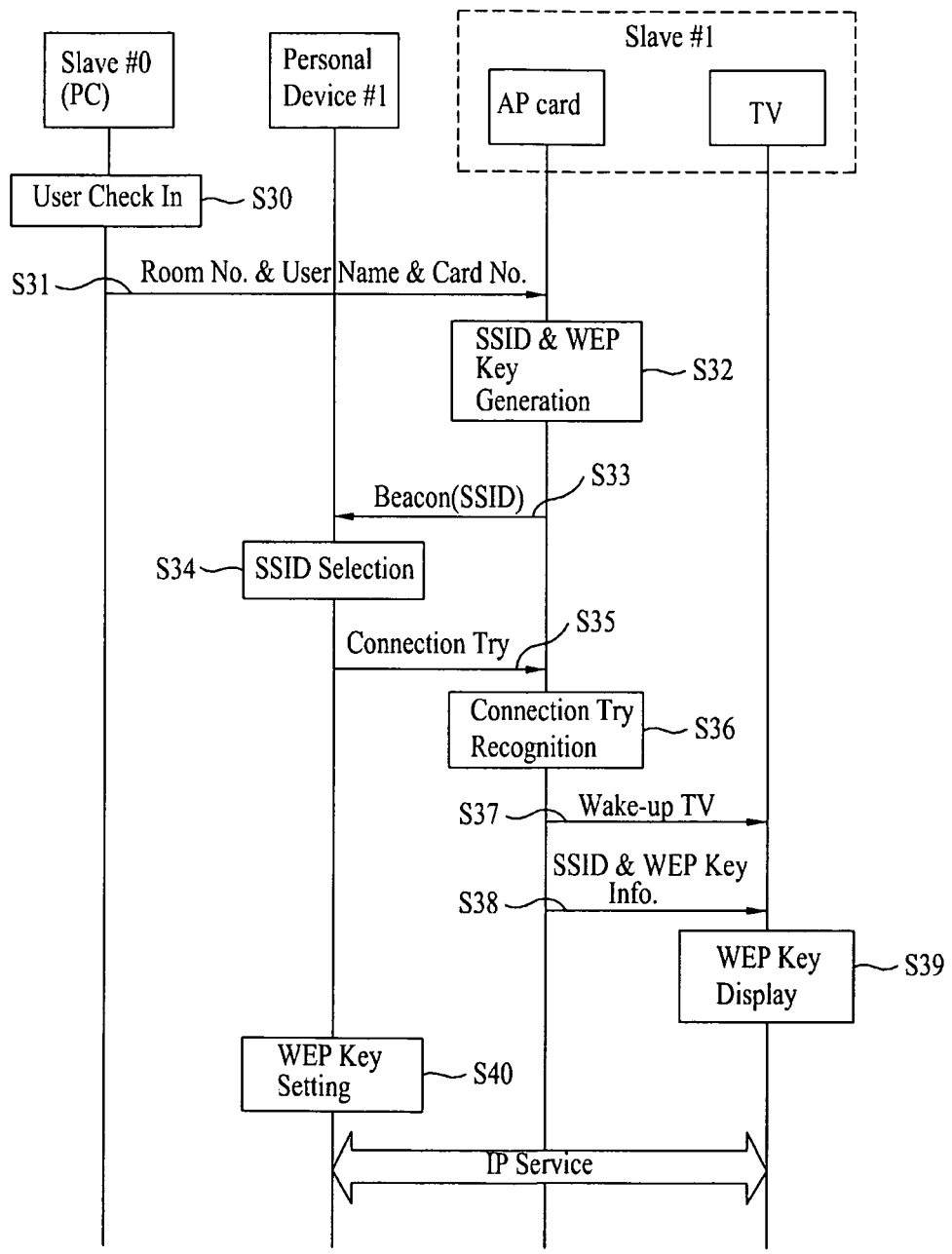
FIG. 11 is a flowchart illustrating a method for providing an Internet service according to a second embodiment of the present invention.

FIG. 11 is a flowchart illustrating a method for providing an Internet service according to a second embodiment of the present invention.

For example, if a user who desires to lodge in a hotel checks in to the hotel at step S30, a management slave (Slave #0) indicating a personal computer (PC) located at the front desk of the hotel may transmit a unique number of a hotel room in which the user will stay, the user's name, the user's resident registration number, or the card number to the AP card of the Slave #1 connected to the Slave #0 through the master 10 at step S31.

In the meantime, the AP card combines the unique number of the hotel room and the user's name, such that it generates a predetermined unique SSID using the combined result. The AP card combines the user's resident registration number and/or the card number, such that it generates a predetermined unique WEP key value at step S32.

The AP card may wirelessly transmit the SSID to the personal device #1 using a beacon signal at step S33.

If the personal device #1 selects the SSID at step S34, the user may attempt to access the Internet service. In this case, the personal device transmits a connection try command signal to the AP card at step S35. If the AP card recognizes an Internet service access attempt signal on the basis of the connection try command signal at step S36, the AP card wakes the DTV contained in the Slave #1 at step S37.

The AP card may transmit the SSID and the WEP key value to the DTV at step S38, and the DTV may display the WEP key value on the screen at step S39.

The user enters the displayed WEP key value in the personal device #1 so as to perform a series of WEP key setup operations at step S40. Thereafter, the user requests the Internet service, such that the personal device #1 can receive the Internet service through the local slave (Slave #1) and the master using the established Internet SSID and WEP key value.

Figure 12:
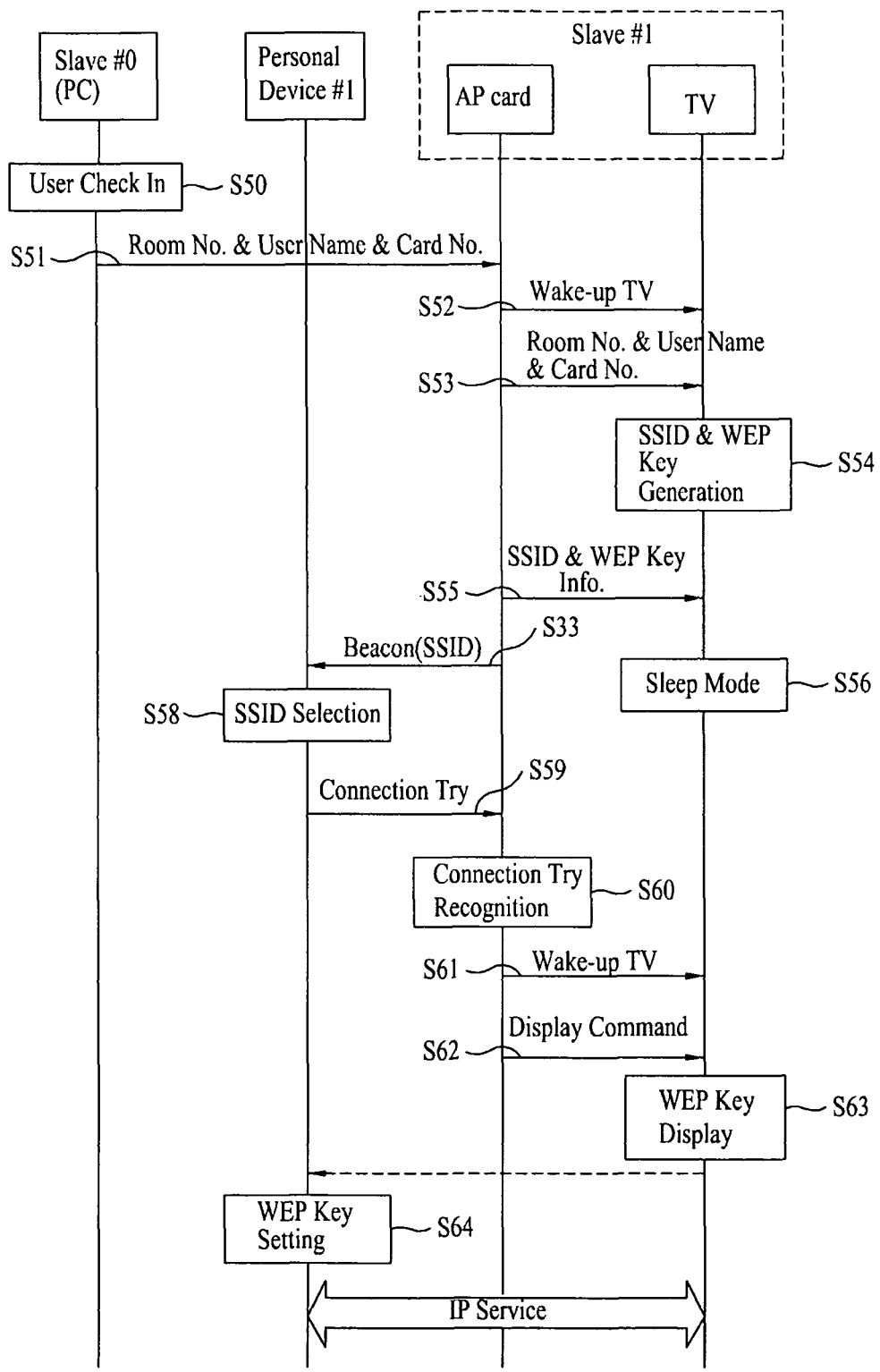
FIG. 12 is a flowchart illustrating a method for providing an Internet service according to a third embodiment of the present invention.

FIG. 12 is a flowchart illustrating a method for providing an Internet service according to a third embodiment of the present invention.

For example, if a user who desires to lodge in a hotel checks in to the hotel at step S50, a management slave (Slave #0) indicating a PC located at the front desk of the hotel may transmit a unique number of a hotel room in which the user will stay, the user's name, the user's resident registration number, or the card number to the AP card of the Slave #1 being connected to the Slave #0 through the master 10 at step S51.

The AP card may wake the DTV of the local slave (Slave #1) at step S52, and transmit a unique number of the hotel room, a user name, and a user's resident registration number or a card number to the DTV at step S53.

The DTV combines the unique number of the hotel room and the user's name such that it generates a predetermined unique SSID. In addition, the DTV combines the user's name, the user's resident registration number, and/or the card number, such that it generates a predetermined unique WEP key value at step S54.

The DTV transmits the SSID and the WEP key value to the AP card at step S55. The DTV automatically enters a power saving mode, i.e., a sleep mode at step S56. The AP card wirelessly transmits the SSID to the personal device #1 using a beacon signal at step S57.

If the personal device #1 selects the SSID at step S58, the user may attempt to access the Internet service. In this case, the personal device #1 transmits a connection try command signal to the AP card at step S59. If the AP card recognizes an Internet service access attempt signal on the basis of the connection try command signal at step S60, the AP card wakes the DTV contained in the Slave #1 at step S61.

The AP card may transmit a command signal that asks the DTV to display the WEP key value to the DTV at step S62, and the DTV may display the WEP key value on the screen at step S63

The user enters the displayed WEP key value in the personal device #1 so as to perform a series of WEP key setup operations at step S64. Thereafter, the user requests the Internet service, such that the personal device #1 can receive the Internet service and the like through the local slave (Slave #1) and the master using the established Internet SSID and WEP key value.

Figure 13:
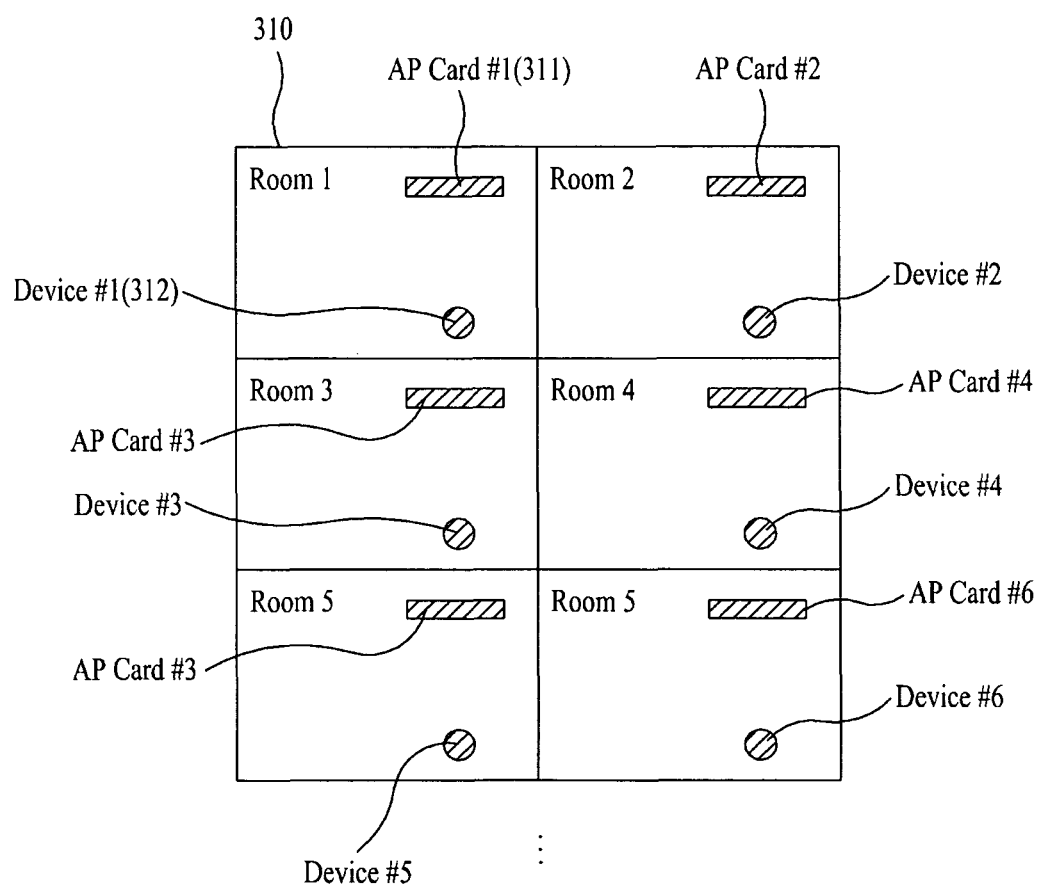
FIG. 13 shows an installation example of AP cards and devices that are located in respective rooms of a limited space such as a hotel or hospital according to one embodiment of the present invention.

FIG. 13 shows an installation example of AP cards and devices that are located in respective rooms of a limited space such as a hotel or hospital according to one embodiment of the present invention.

Referring to FIG. 13, the AP card 311 may be independently located, or may be mounted to the DTV of each room 310.

In the case of using the above-mentioned embodiment, although a first device (Device #1) of a Room 1 is close to an AP Card #3 of a Room 3, it communicates with an AP Card #1 of the Room 1. Similarly, although a second device (Device #2) of a Room 2 is close to the AP Card #4 of the Room 4, it communicates with the AP Card #2 of the Room 2. Therefore, respective AP cards may not communicate with devices of other rooms whereas they can communicate with devices of a corresponding physical space. That is, according to one embodiment of the present invention, the user of each room may sufficiently receive a communication service of a given bandwidth, irrespective of an amount of data used for communication with a user of another room.

Further, the network management server may transmit the same or another control signal to AP cards of individual rooms shown in FIG. 13. As a result, the DTV to which the AP card of each room is mounted can display a room interactive service including a variety of services capable of being provided in the hotel, for example, room service, hotel information, a reservation service, a check-out information service, an entertainment service, a game service, etc.

Different room interactive services may be provided to individual rooms. Otherwise, only some rooms of the hotel may receive different room interactive services, or all the rooms of the hotel may receive the same room interactive services.

In the meantime, the device 312 located at each room 310 of the hotel may receive data of a VoIP service, data of a VOD service, or data of an Internet service.

Figure 14:
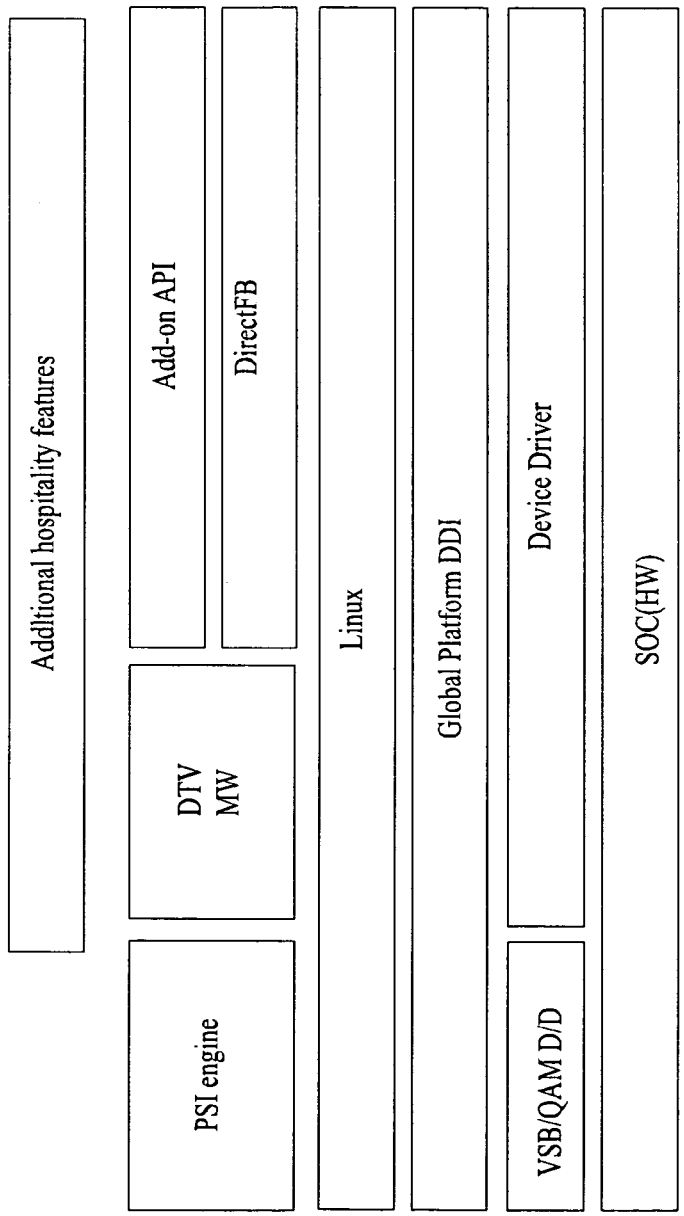
FIG. 14 shows a general middleware platform of a DTV according to the related art.
Figure 15:
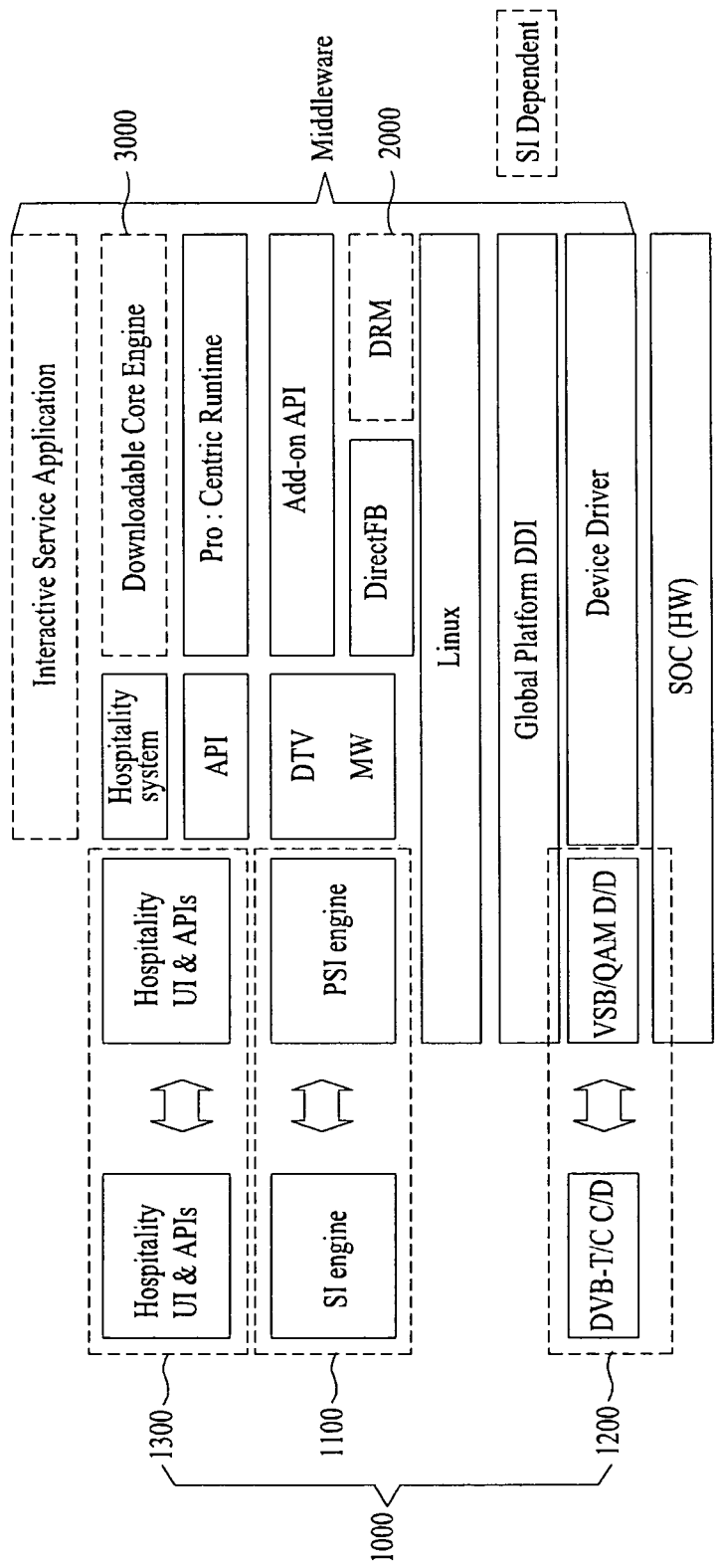
FIG. 15 is a block diagram illustrating a hospitality middleware platform of a DTV according to one embodiment of the present invention.

FIG. 14 shows a general middleware platform of a DTV according to the related art. FIG. 15 is a block diagram illustrating a hospitality middleware platform of a DTV according to one embodiment of the present invention. A method for incorporating a conventional DTV into a middleware platform of the DTV under a hospitality environment such as a hotel or hospital will hereinafter be described with reference to FIGS. 3, 14 and 15.

In accordance with the related art shown in FIG. 3(a), respective System Integration (SI) companies provide hardware-based IP Set Top Boxes (IP STBs).

However, a process for manufacturing each IP STB in the form of a hardware structure requires high costs, has difficulty in improving interactivity quality, and is unable to guarantee compatibility.

Further, as shown in FIG. 14, according to the related art, each SI company has manufactured a unique middleware structure, such that the related art has a disadvantage in that individual SI companies should provide different IP STBs to the user.

Therefore, the embodiment of the present invention has an objective to incorporate different STBs of individual SI companies into one hospitality middleware platform using a runtime library of the middleware platform embedded in the DTV under the hospitality environment such as a hotel or hospital.

In addition, the embodiment of the present invention provides a system that implements a conventional STB as a software solution, such that applications of many SI companies can be easily downloaded in the hospitality middleware platform.

For example, the hospitality middleware platform according to one embodiment of the present invention adds the hospitality User Interface (UI) & API layer, and divides the hospitality User Interface (UI) & API layer into a hospitality system layer and a hospitality API layer. In addition, the hospitality middleware platform according to one embodiment of the present invention has an objective to provide a system that can cope with one DTV irrespective of a region covered by another broadcast standard.

In other words, as shown in FIG. 15, the hospitality middleware platform according to one embodiment of the present invention may be mounted to, for example, a DTV located in one space among several independent spaces physically separated from one another. The platform includes a switching layer 1000, a flexible DRM layer 2000, and a downloadable engine layer 3000. The switching layer 1000 may switch a first layer for processing a broadcast signal based on a broadcast standard of a first region and a second layer for processing a broadcast signal based on a broadcast standard of a second region. The flexible DRM layer 2000 may be voluntarily modified. The downloadable engine layer 3000 is able to voluntarily program the interactive service application.

The switching layer 1000 consists of a triple switching layer. For example, the triple switching layer includes a first switching layer 1100, a second switching layer 1200, and a third switching layer 1300. The first switching layer 1100 may switch the SI engine layer and the PSI engine layer. The second switching layer 1200 may switch a DVB-T/C layer and a VSB/QAM layer. The third switching layer 1300 may switch the hospitality UI layer of the first region and the hospitality UI layer of the second region. Further, the first region may be, for example, Europe, Middle East, Africa (EMEA), and the second region may be, for example, North America. Therefore, in the case of using the hospitality middleware platform to which the switching layer is added, it is possible to use the DTV having the hospitality middleware platform irrespective of regions having different broadcast standards.

The flexible DRM layer 2000 may be optionally modified by such SI company or the like in consideration of the case wherein individual SI companies use different DRM schemes.

The downloadable engine layer 3000 may correspond to a hospitality system layer, and may be a layer that can be programmed by the SI company or the like. Since the interactive service application shown in FIG. 14 relates to a UI needed for the guest who uses the hospitality system layer, the hospitality system layer is needed when individual SI companies manufacture unique interactive service applications.

In the meantime, the independent spaces physically separated from one another correspond to several rooms contained in one hotel. In this case, the interactive service application may include an application for processing data related to a unique special service of the hotel.

In accordance with another embodiment of the present invention, the hospitality middleware platform may further include a runtime library for voluntarily programming the interactive service application on the downloadable engine layer. As shown in FIG. 14, the runtime library is located close to the downloadable engine layer on the hospitality middleware platform. The runtime library may correspond to the hospitality API layer. The hospitality API layer is an API that is distributed along with the Software Developer's Kit (SDK) so as to program the hospitality system layer.

Therefore, the DTV including the hospitality middleware platform shown in FIG. 15 receives a broadcast signal from the management server, processes the received broadcast signal on the hospitality middleware platform embedded in the DTV, and outputs A/V data on the basis of the processed broadcast signal. As described above, the platform includes a switching layer, a flexible DRM layer, and a downloadable engine layer. The switching layer may switch a first layer for processing a broadcast signal based on a broadcast standard of a first region and a second layer for processing a broadcast signal based on a broadcast standard of a second region. The flexible DRM layer may be voluntarily modified. The downloadable engine layer is able to voluntarily program the interactive service application.

In accordance with one embodiment of the present invention, various solutions that have been provided from only the STB are configured in the form of software, are embedded in the DTV, such that one DTV can separately cope with all SI systems.

In addition, in accordance with one embodiment of the present invention, the middleware platform deals with the SI such that the costs for manufacturing the STB and resource consumption required for manufacture/management can be greatly reduced.

In accordance with the aforementioned embodiment of the present invention, differences encountered when implementing a DTV for use in different regions (e.g., Europe, North America, etc.) having different broadcast standards can be solved by software, so that there is no need to manufacture different DTVs or STBs for individual regions.

In the meantime, the product invention and the process invention have been disclosed in the present invention, and the product invention may be complementary to the process invention as necessary.

The method disclosed in the present invention may be implemented in the form of program commands executable by a variety of computer means, and recorded on a computer-readable recording medium.

The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler.

The above-stated hardware devices may be configured to operate as one or more software modules to perform the operation of the present invention, and vice versa. Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

As apparent from the above description, the present invention provides a technology for automatically generating customized service information, and provides the customized service information to a guest who uses a hotel or the like. In addition, the present invention can provide a technology for providing the customized service information and at the same time improving security.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a digital television (DTV) located in one independent space among a plurality of independent spaces physically separated from one another, wherein the DTV includes an access point (AP) card, the method comprising:
   receiving guest information recorded in a storage area of a wireless communication unit and a wired equivalent privacy (WEP) key value of the AP card;
   receiving the WEP key value corresponding to the AP card of the DTV and a broadcast signal from a management server;
   comparing the WEP key value received from the wireless communication unit with the WEP key value received from the management sever by the access point;
   generating at least one recommendation service information dependent on the guest information based on the information stored in the storage area of the wireless communication unit and the management server;
   processing the received broadcast signal using middleware platform embedded in the DTV, wherein the middleware platform supplements user interface and access point interface (UI & API), and further separates the UI & API layer into system layer and API layer; and
   outputting audio/video (A/V) data on the basis of the processed broadcast signal and displaying the generated recommendation service information in the DTV,
   wherein the middleware platform includes:
      a switching layer for switching a first layer for processing a broadcast signal based on a broadcast system of a first region and a second layer for processing a broadcast signal based on a broadcast system of a second region;
      a flexible Digital Rights Management (DRM) layer capable of being voluntarily modified; and a downloadable engine layer capable of voluntarily programming an interactive service application.

2. The method according to claim 1, wherein the middleware platform includes a runtime library for voluntarily programming the interactive service application on the downloadable engine layer, wherein the runtime library is located close to the downloadable engine layer on the middleware platform.

3. The method according to claim 1, wherein the independent spaces physically separated from one another correspond to several rooms contained in one hotel.

4. The method according to claim 3, wherein the interactive service application includes an application for processing data related to a unique special service provided from the hotel.

5. A digital television (DTV) located in one independent space among a plurality of independent spaces physically separated from one another, wherein the DTV includes an access point (AP) card, the digital television (DTV) comprising:
- a first reception module for receiving guest information recorded in a storage area of a wireless communication unit and a wired equivalent privacy (WEP) key value of the AP card;
- a second reception module for receiving the WEP key value corresponding to the AP card of the DTV and a broadcast signal from a management server and the wireless communication unit by an access point;
- a comparison module for comparing the WEP key value received from the wireless communication unit with the WEP key value received from the management server by the access point;
- a generation module for generating at least one recommendation service information dependent on the guest information based on the information stored in the storage area of the wireless communication unit and the management server;
- a processor for processing the received broadcast signal using a middleware platform embedded in the DTV, wherein the middleware platform supplements user interface and access point interface layer (UI & API), and further separates the UI & API layer into system layer and API layer; and
- an output for outputting audio/video (AN) data on the basis of the processed broadcast signal and displaying the generated recommendation service information in the DTV, wherein the middleware platform includes:
- a switching layer for switching a first layer for processing a broadcast signal based on a broadcast system of a first region and a second layer for processing a broadcast signal based on a broadcast system of a second region;
- a flexible Digital Rights Management (DRM) layer capable of being voluntarily modified; and
- a downloadable engine layer capable of voluntarily programming an interactive service application.

6. The digital television (DTV) according to claim 5, wherein the middleware platform includes a runtime library for voluntarily programming the interactive service application on the downloadable engine layer, wherein the runtime library is located close to the downloadable engine layer on the middleware platform.

7. The digital television (DTV) according to claim 5, wherein the independent spaces physically separated from one another correspond to several rooms contained in one hotel.

8. The digital television (DTV) according to claim 7, wherein the interactive service application includes an application for processing data related to a unique special service provided from the hotel.

* * * * *